(12) United States Patent
Mulla et al.

(10) Patent No.: US 6,311,896 B1
(45) Date of Patent: Nov. 6, 2001

(54) COMPACT BAR CODE SCANNER

(75) Inventors: Altaf Mulla, Merrick; Edward Barkan, Miller Place; Lisa Fan, Commack, all of NY (US); Gregory James, Seattle, WA (US); Margaret Hetfield, East Northport, NY (US); Joseph Giordano, Bayville, NY (US); Yuri Gofman, Bohemia, NY (US); Robert Sanders, St. James, NY (US); Daniella Strat, Sound Beach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/467,905

(22) Filed: Dec. 21, 1999

Related U.S. Application Data (63) Continuation-in-part of application No. 09/067,124, filed on Apr. 27, 1998, now Pat. No. 6,158,662, which is a continuation-in-part of application No. 08/820,048, filed on Mar. 18, 1997, now Pat. No. 5,744,791, which is a division of application No. 08/686,157, filed on Jul. 24, 1996, now Pat. No. 5,801,371, which is a division of application No. 08/407,577, filed on Mar. 30, 1995, now Pat. No. 5,600,121.
(60) Provisional application No. 60/114,028, filed on Dec. 29, 1998.

(51) Int. Cl.$^7$ .................................................. G06K 7/10
(52) U.S. Cl. ............................. 235/472.03; 235/472.01; 235/472.02
(58) Field of Search ....................... 235/472.03, 472.01, 235/472.02

(56) References Cited

U.S. PATENT DOCUMENTS

| | | |
|---|---|---|
| 4,850,009 | 7/1989 | Zook et al. . |
| 4,868,375 | 9/1989 | Blanford . |
| 4,962,980 | 10/1990 | Knowles . |
| 5,324,922 | 6/1994 | Roberts . |
| 5,412,198 | 5/1995 | Dvorkis . |
| 5,422,471 | 6/1995 | Plesko . |
| 5,477,043 | 12/1995 | Dvorkis . |
| 5,481,099 | 1/1996 | Dvorkis . |
| 5,543,610 | 8/1996 | Bard . |
| 5,600,121 | 2/1997 | Kahn et al. . |
| 5,665,953 | 9/1997 | Mazzamuto et al. . |
| 5,693,929 | 12/1997 | Dvorkis et al. . |
| 5,742,038 | 4/1998 | Dvorkis et al. . |
| 5,763,865 | 6/1998 | Swift et al. . |
| 5,794,207 | 8/1998 | Walker et al. . |
| 5,801,371 | 9/1998 | Kahn et al. . |
| 5,808,287 | 9/1998 | Shepard et al. . |
| 5,874,720 | 2/1999 | Dvorkis et al. . |
| 5,874,722 | 2/1999 | Rando et al. . |
| 5,877,485 | 3/1999 | Swartz . |
| 6,119,944 | * 9/2000 | Mulla et al. ........................ 235/472.03 |

OTHER PUBLICATIONS

Advertisement, "CueCat™", Parade Magazine, Washington Post, Sep. 2000.

* cited by examiner

Primary Examiner—Harold I. Pitts
(74) Attorney, Agent, or Firm—Burns, Doane, Swecker & Mathis, L.L.P.

(57) ABSTRACT

A compact optical code reader is disclosed having multiple functions and a unique shape and configuration of actuators and indicators. A system including the reader also includes a cradle, interface and host terminal, capable of performing various data processing functions involving scanned data.

12 Claims, 7 Drawing Sheets

COMPACT BAR CODE SCANNER

This application claims priority to U.S. provisional Application Serial. No. 60/114,028 filed Dec. 29, 1998 which is hereby incorporated by reference. This application is also a Continuation-in-Part of application Ser. No. 09/067,124 filed Apr. 27, 1998, now U.S. Pat. No. 6,158,662 (which is hereby incorporated by reference) which is a Continuation-in-Part of U.S. Ser. No. 08/820,048 filed Mar. 18, 1997, now U.S. Pat. No. 5,744,791, which is a Division of application Ser. No. 08/686,157 filed Jul. 24, 1996, now U.S. Pat. No. 5,801,371, which is a Division of application Ser. No. 08/407,577 filed Mar. 30, 1995, now U.S. Pat. No. 5,600,121.

BACKGROUND

This application is also a continuation-in-part application Ser. No. 08/794,782 filed Feb. 3, 1997 and related to U.S. application Ser. No. 09/166,816 filed Oct. 5, 1998.

1. Field of the Invention

The present invention relates to methods and apparatus for electro-optically reading symbols, for example, bar code or matrix array symbols and, in preferred embodiments, to a compact, hand held optical code reading system with multiple user actuatable functions and feedback signals.

2. Background and Objects

Code readers are known in the prior art for reading various symbols such as bar code symbols appearing on a label or on the surfaces of an article. The bar code symbol itself is a coded pattern of indicia comprised of a series of bars of various widths spaced apart from one another to bound spaces of various widths, the bars and spaces having different light reflecting characteristics. The readers in scanning or imaging systems electro-optically transform the graphic indicia into electrical signals, which are decoded into information, typically descriptive of the article or some characteristic thereof. Such characteristics are conventionally represented in digital form and used as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026 and 5,600,121, all of which have been assigned to the same assignee as the instant application. As disclosed in some of the above patents, such systems may employ a hand held, portable laser scanning device held by a user, which is configured to allow the user to aim the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, i.e., the bars and spaces of the symbol.

In the laser beam scanning systems known in the art, the laser light beam is directed by a lens or other optical components along the light path toward a target that includes a bar code symbol on the surface. The moving-beam scanner operates by repetitively scanning the light beam in a line, pattern or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or both.

Bar code reading systems also include a sensor or photo detector which detects light reflected or scattered from the symbol. The photo detector or sensor is positioned in the scanner in an optical path so that it has a field of view which ensures the capture of a portion of the light which is reflected or scattered off the symbol. This light is detected and converted into an electrical signal. Electronic circuitry and software decode the electrical signal into a digital representation of the data represented by the symbol that has been scanned. For example, the analog electrical signal generated by the photo detector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented.

The decoding process of known bar code reading system usually works in the following way. The decoder receives the pulse width modulated digitized signal from the digitizer, and an algorithm, implemented in the software, attempts to decode the signal. If the start and stop characters and information between them in the scan were decoded successfully, the decoding process terminates and an indicator of a successful read (such as a green light and/or an audible beep) is provided to the user. Otherwise, the decoder receives the next scan, performs another decode attempt on that scan, and so on, until a satisfactorily decoded scan is achieved or no more scans are available.

Such a signal is then decoded according to the specific symbology into a binary representation of the data encoded in the symbol, and to the information or alphanumeric characters so represented. The decoded information may be stored or subjected to data processing.

Moving-beam laser scanners are not the only type of optical instrument capable of reading bar code symbols. Another type of bar code reader is one which incorporates detectors based on solid state imaging arrays or charge coupled device (CCD) technology. In such prior art readers the detector is typically smaller than the symbol to be read. Accordingly, image reduction is performed by an objective lens in front of the array or CCD. The symbol may be illuminated with light from a light source such as light emitting diodes (LED) in the scanning device, and each array cell is sequentially read out to determine the presence of a bar or a space. A code reading engine employing imager technology is disclosed in U.S. application Ser. No. 09/096,578 filed Sep. 1, 1998 and assigned to applicant herein.

It is known to provide multiple actuators in hand held optical code readers. For example, a system disclosed in U.S. Pat. No. 5,117,098, uses a multi-position trigger switch in a hand-held laser scanner. The scanner is aimed at the symbol to be scanned during a first operational state in which an aiming pattern is emitted. Once the user had aligned the scanner properly with respect to the location of the symbol, the trigger switch is actuated again to put the device into a second operational state in which the beam is scanned across the symbol in the normal scanning or reading mode, and the symbol decoded. European Patent No. 0355355 describes a combination bar code reader and EAS tag deactivator, including an embodiment with a multi-position trigger.

U.S. Pat. No. 5,600,121, assigned to applicant, discloses, inter alia a system for reading indicia such as bar code symbols having a scanner for generating a scanning light beam directed toward a symbol to be read; a first actuator manually displaceable form a first position to a second position for producing a first light beam for aiming or positioning the reader, and a second actuator manually displaceable from a first position to a second position for initiating a scanning beam pattern for reading the symbol. The actuators are independently operative of each other. A detector receives the reflected light from the symbol and produces electrical signals corresponding to data represented by the symbol. A graphical user interface simplifies system control functions.

There is a need, however, for a more compact and versatile bar code reader which is simply and inexpensively fabricated. Moreover, such a reader would be easy to use and provide user access and feedback for a broad range of functions.

Accordingly, it is an object of the present invention to provide a compact and versatile bar code reader which is simply and inexpensively fabricated.

It is another object of the present invention to provide a hand held bar code reader with an ergonomically designed shape and configuration of actuators and indicators.

It is a further object of the present invention to provide a bar code reader which provides a broad range of data acquisition, data verification and downloading functions, while being easy to use and providing feedback to the user.

These and other objects and features will be apparent from the following summary and descriptions of preferred embodiments.

SUMMARY

A portable hand held optical code reader is disclosed which includes a housing, data processing circuitry and a code reading module. The code reading module is located in the housing. The housing is of a generally elongate bar shape equal to or less than four and three-quarters inches in length having generally opposing upper and lower broad faces, shallow side faces and front and rear ends. The housing has a circumference of no greater than five inches and is shaped generally elliptically when viewed from a side. The rear end of the upper and lower faces is rounded when viewed from above.

The housing further includes at least one actuator, preferably two, the actuator(s) being located on the upper face of the housing. A reading window is located on the front end face of the housing. The housing is sized and configured to be held in the palm of the user's hand and actuated by one or more fingers of the user.

The hand held code reader may be part of a portable data collection system. The hand held reader may be a battery operated mobile unit for acquiring and storing data. Data may be stored in the reader's memory including, for example, UPC item codes, quantity data, electronic coupon data, transaction summaries, decode counts, etc. A host terminal with superior data access, and computational and display capabilities may be used in conjunction with the code reader to enhance system versatility and performance.

A docking station may provide an interface with the host terminal. The docking station may include a cradle adapted to receive and secure the mobile, handheld reader. A detector detects when the reader is placed in the cradle. Data received from the reader may be selectively downloaded when the reader is placed in the cradle. An actuator on the reader may be employed for initiating the transfer of data to a processor in the host terminal if the detector indicates the reader has been placed in the cradle.

The data interface may be electrical or optical. In the latter case, in a preferred embodiment, the cradle is equipped with an LED and a photo detector. The LED is positioned to project optical data signals through the scan window of the code reader when it is inserted into the cradle. Optical data signals from the code reader may be emitted by one or more display LEDs of the code reader, which signals are detected by the cradle photo detector.

In preferred embodiments, the portable code reader includes a light source for generating a beam directed toward a symbol to be read. A detector receives light from the symbol to produce electrical signals corresponding to data represented by the symbol. A first actuator is operatively connected to the reader and manually displaceable from a first position to a second position; and a second, less accessible, actuator is operatively connected to the reader, independently operative from the first actuator, and manually displaceable from a first position to a second position.

In a more preferred embodiment, the first and second actuators are generally identified with the functions of scan and delete, respectively. The pressing and holding of the appropriate actuator for a scanning period (for example, 3 seconds) while scanning an item bar code serves to perform the identified function, i.e. increasing the count of the item by one in the case that the first actuator is pressed or decreasing the count of the item by one when the second actuator is pressed. Holding one of the actuators for a longer period of time while scanning an item may perform a different function. For example, holding the second actuator for 3 seconds past the scan time may cause the code reader to perform the clear all function, i.e. reduce the count of the scanned item to zero.

The approximately simultaneously activation of said first actuator and said second actuator followed by holding of both actuators for a predetermined interval may be used to change the mode of operation of the reader. In one embodiment, the code reader has an operating mode and a non-operating mode, and the actuation of both actuators changes the code reader between said operating and said non-operating mode, for example to lock out further operation of the code reader. Alternatively, the reader has a first and a second operating mode, and the actuation of both actuators changes the code reader from the first to the second operation modes or vice versa.

The mobile or hand held unit may include a laser scan module. The module includes a generally circular planar base including a circuit board. A semi-conductor light source may be supported by the base, for generating a laser beam along a first optical path to a symbol to be read. A generally planar, reciprocally oscillatable reflector may be positioned above the base and located in the first optical path, for directing the laser beam impinging on the reflector to the symbol. A spring is coupled to the reflector, and supports the reflector for reciprocal oscillating movement. A drive supported by the base reciprocally oscillates the reflector, the drive including a permanent magnet operatively connected to the reflector, and an electromagnetic coil positioned adjacent thereto. When an alternating drive signal is applied to the coil, the coil produces an alternating magnetic field which acts on the permanent magnet to oscillate the magnet and, in turn, flex the spring and reciprocally oscillate the reflector about an axis.

A photo detector mounted on the base generates an electrical signal indicative of the detected light intensity. A one piece optical element includes a beam folding section for folding the laser beam prior to transmission to said reflector and a collection mirror portion arranged to receive retro-reflected light from the reflector and to direct it to said photo detector.

The foregoing has been provided as a convenient summary of preferred embodiments. However, the invention to be protected is defined by the claims herein and the range of equivalents properly accorded thereto.

DETAILED DESCRIPTION OF PREFERRED EMBODIMENTS

Table of Contents

Figures 1, 2, 3:
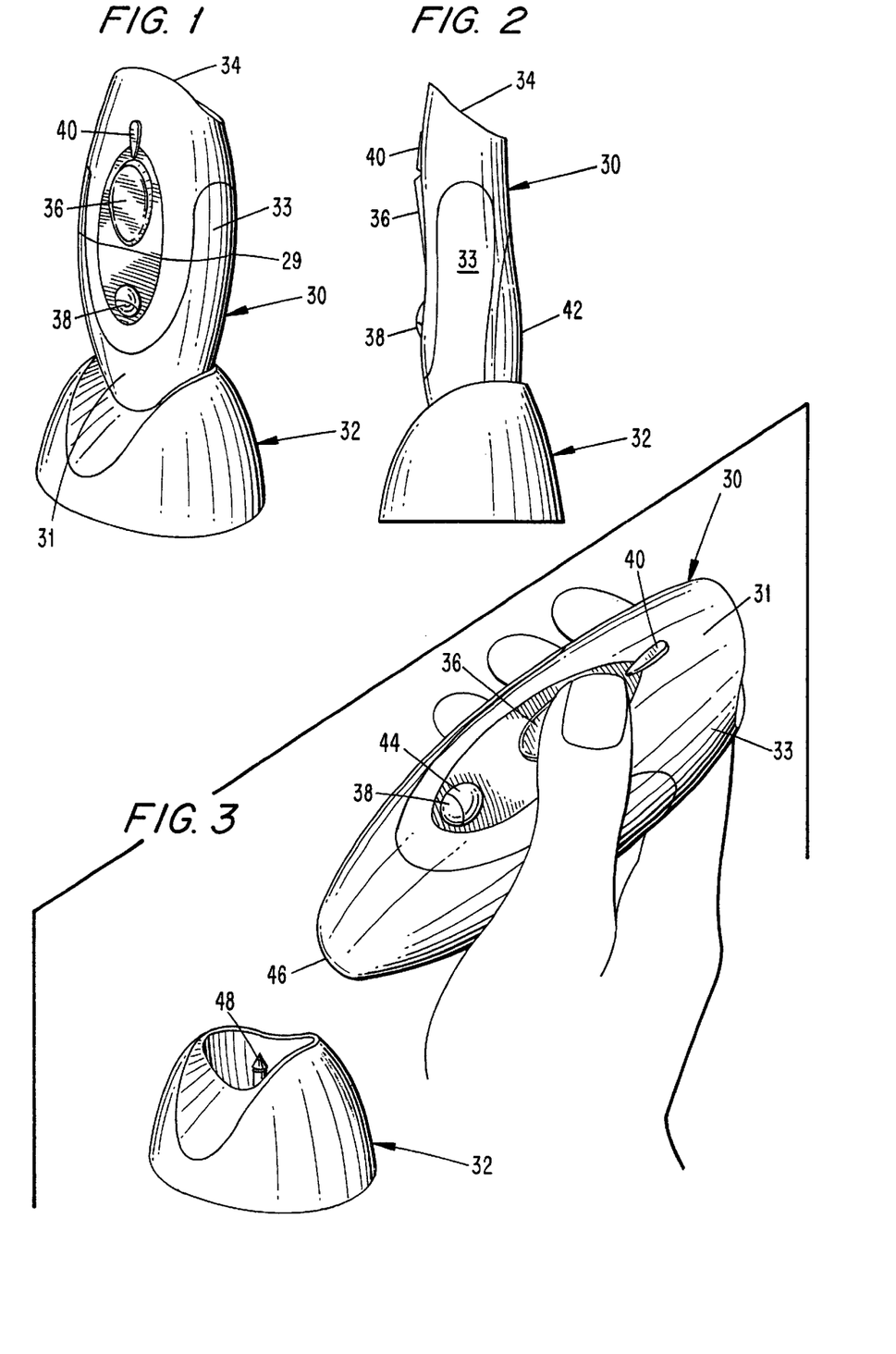
FIG. 1 is a pictorial view of an optical code reader and cradle in accordance with a preferred embodiment of the present invention.
FIG. 2 is a side view of the code reader and cradle of FIG. 1.
FIG. 3 is a pictorial view of the optical code reader of FIG. 1 removed from its cradle and held in the palm of the hand of a user.

I. Housing Actuators and Ergonomics of Code Reader Embodiments
II. Cradle, and Electrical and Optical Interfaces
III. Internal Construction Including Single Circuit Board and Battery Terminal Structure
IV. Optical/Electronic Systems
V. Host Terminal Implementations and Uses for the Code Reader
VI. Optomechanical Layout of Cylindrical Module Embodiment
VII. Actuator States, Timing, Indicators and Functionality Many aspects of the present invention are contained in or useable in a preferred embodiment of the present invention whose external construction and appearance are depicted in FIGS. 1–3.

This portable handheld optical code reader 30 is of a generally elongate bar shape equal to or less than four and three quarters inches in length having generally opposing upper and lower broad faces 31 and shallow side faces 33. The circumference of the code reader at its thickest portion 29 is about five inches, such that it fits comfortably in the average human hand as shown in FIG. 3. The front end is truncated to form a face to accommodate a scanner exit window 34. The rear end 35 is generally tapered and is adapted to nest in a cradle 32. Overall the reader is shaped generally elliptically when viewed from the angles shown in FIGS. 1 and 3.

It will be understood that many aspects of the present invention described below may be adapted for use in this as well as other handheld or stationary optical code readers.

I. Housing, Actuators and Ergononzics of Code Reader Embodiments

FIGS. 1 and 2 are, respectively, pictorial and side views of the optical code reader 30 and cradle 32 configured in accordance with a preferred embodiment of the present invention. The code reader 30 is generally elliptical in shape with slightly rounded upper and lower ends as viewed in FIGS. 1 and 3. FIG. 2 is a right side view of the code reader. The left side view is a mirror image of FIG. 2.

A scanner exit window 34 is located at one end of the reader (the top end in FIGS. 1 and 3). The actuators comprise a scan button 36 and a delete button 38. Feedback to the user is provided by a three-color LED display visible through LED window 40. A removable battery cover 42 is located on the opposite side of the reader from the buttons and LED window.

FIG. 3 is a pictorial view of the optical code reader 30 of FIGS. 1 and 2, shown removed from the cradle 32 and held in the hand of the user. The Figure illustrates, among other things, the approximate size of the code reader. The FIG. also shows how the code reader fits in one hand, where it can be easily and accurately aimed. The scan button 36 may be pressed with the thumb to initiate scanning. Access to the delete button 38 is partially obstructed by a raised casing area 44, which reduces the possibility of inadvertent actuation of the delete button 38.

II. Cradle, and Electrical and Optical Interfaces

With continued reference to FIG. 3, the code reader 30 also may include a communication connector socket 46 at the rear end of the device into which a plug 48 may be inserted. The plug and socket may be used to electronically transfer collected optical code data to a personal computer or other suitable data handling terminal.

In a more preferred embodiment the plug 48 is a miniature stereo phone plug located in the cradle 32. The structure of such a cradle and plug is shown in greater detail in the cross-sectional view of FIG. 4(a). The structure may be easily fabricated from a pre-made miniature phone plug and cable assembly 50. The plug portion 52 may have a molded casing 54 which snaps into and out of corresponding walls 56 of the cradle 32. This construction has the advantage that a stock cable can be used for communication either by itself or in conjunction with the cradle 32. A switch in the socket 46 may be used to detect insertion of the plug and to disable the laser scanner when the plug is inserted in the code reader.

Figures 4A, 4B, 7, 8, 9:
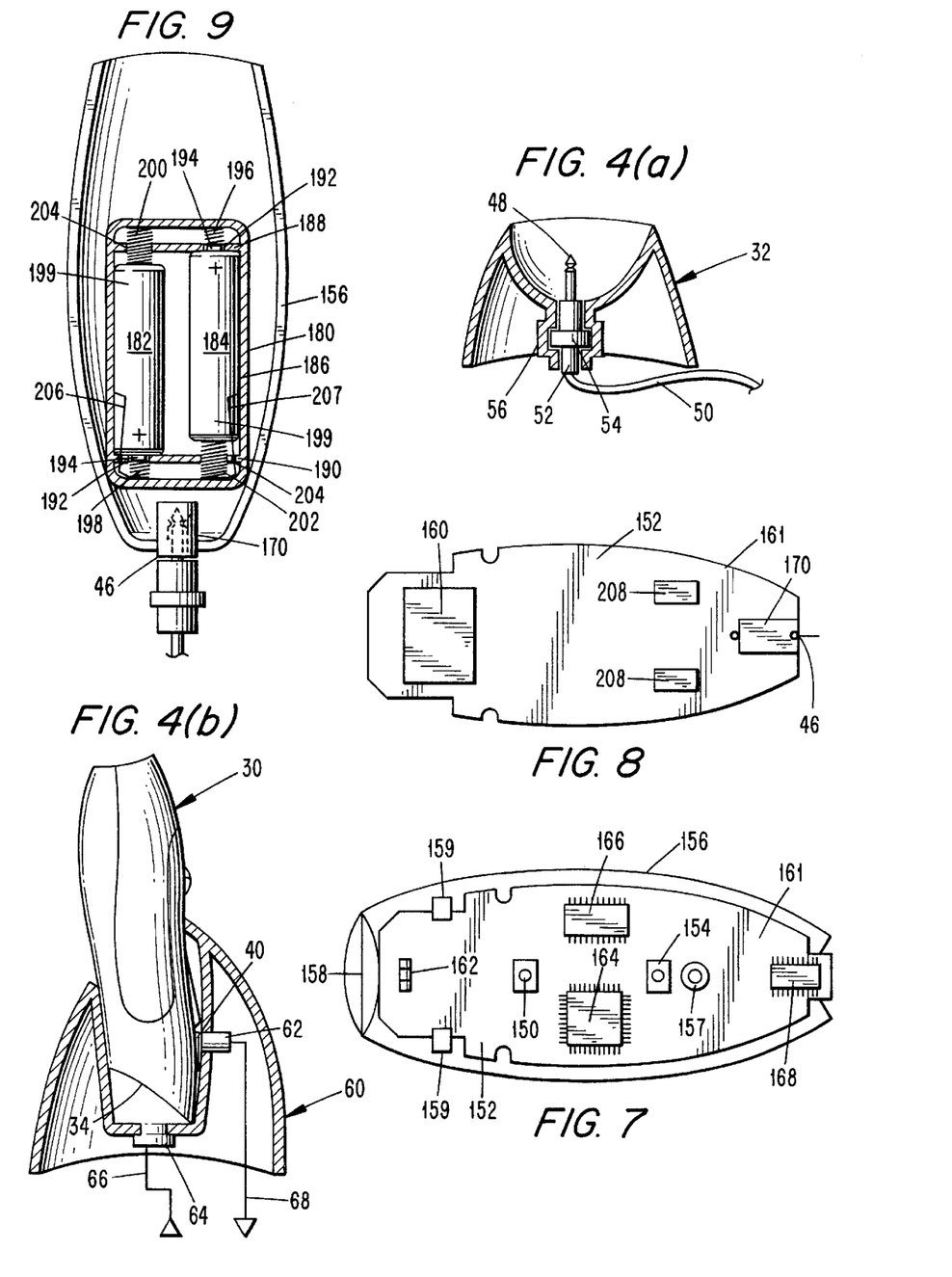
FIGS. 4a and 4b are cross-sectional side views of two cradles employed in preferred embodiments of the present invention.
FIGS. 7 and 8 are, respectively, top and bottom views of a circuit board assembly used in a preferred embodiment of the present invention.
FIG. 9 is a top view of a bottom housing half of an optical code reader of a preferred embodiment of the present invention, in partial cut away.

An optional optical interface may also be conveniently provided using a suitable cradle or docking station. The structure of such a cradle 60 is shown in FIG. 4(b) in cross-section. A code reader 30 of a preferred embodiment of the present invention is shown inserted in the cradle 60. When so inserted the LED display window 40 of the reader is located adjacent to a photo detector 62. A light emitting element or LED 64 is located on a optical path of the code reader 30, to project an optical signal to the code reader 30 through the scanner exit window 34.

In operation an RS 232 output port of the reader 30 may be electrically connected to the LED display and to a photo detector employed in the scanning module of the reader. Data may be input into the reader 30 by means of the LED 64 as indicated by signal line 66. Light produced by the LED 64 is projected along an optical input path which may be collinear with an optical input path of the scanner during normal scanning operations. Detection input data may be digitized and applied to a data receptor line of a microcontroller of the reader. Advantageously, the input data may be transmitted at about a 9600 band rate which approximates the frequency band associated with light signals produced when a bar code is scanned. Thus, the input electronics of the reader may be optimized to one frequency band common to both bar code scanning and optical interface signal input.

Data may be optically outputted from the code reader 30 by employing the display LED. Light produced by a display LED for example a red display LED may pass through LED display window 40 and be detected by the photo detector 62, where it is converted to a electrical signal and passed to a host or terminal as indicated by signal line 68.

It will be understood from the foregoing that the reader 30 may be provided with two modes of connectivity: electrical and optical. The electrical communication mode may be implemented at lower cost and may be more appropriate for home use, especially where the reader host is a home personal computer. The optical cradle requires electrical power for the LED 64. It may be more appropriate in heavy use environments such as a centralized host Kiosk in a store which exchanges data with may code readers and which is always ready to accept data from the code readers it services. It will be understood that while the optical interface cradle or dock may be more expensive to fabricate, it is less susceptible to wear and tear caused by, for example, electrical contact degradation.

Further alternative types of cradles or docks may employ either of the above described electrical or optical interfaces, but contain further circuitry permitting direct access to and communication with telephone, cable or internet lines.

III. Internal Construction

Figure 5:
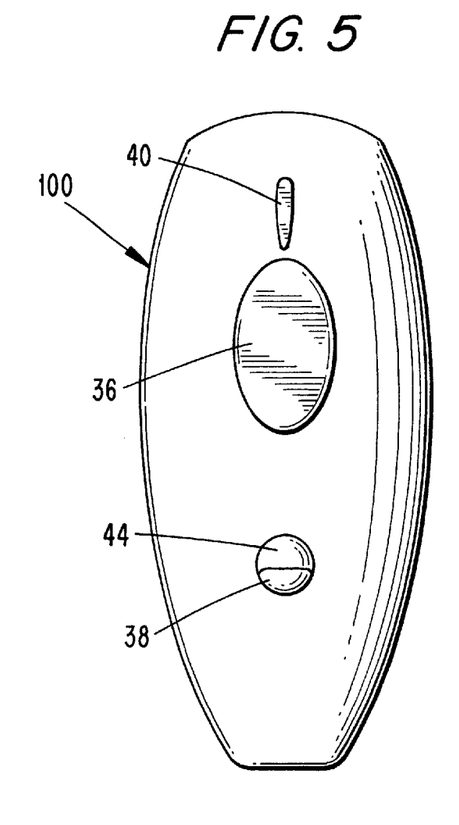
FIGS. 5 and 6 are, respectively, a top view and a bottom view of a top housing half of an optical code reader of a preferred embodiment of the present invention.
Figure 6:
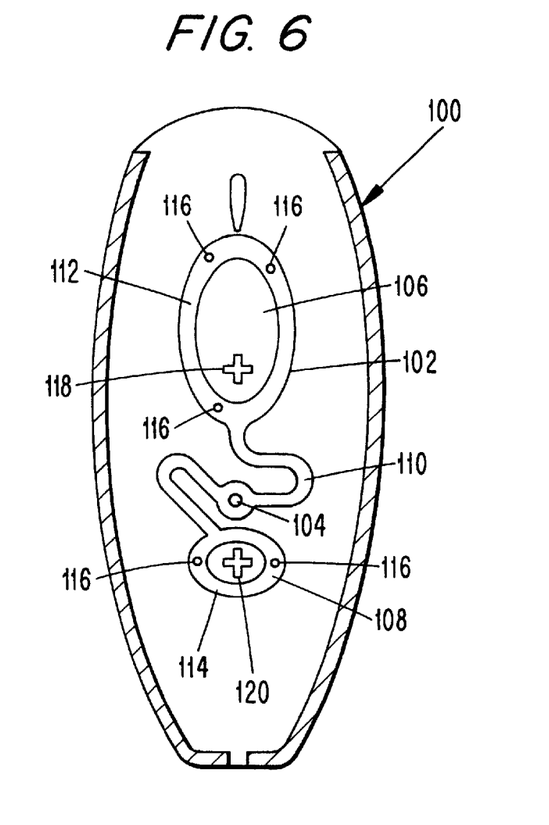

The internal construction of the optical code reader 30 of FIGS. 1 through 3 will now be described. The top housing half 100 of the optical code reader is shown in plan view in FIG. 5, wherein like features of the embodiment of the preceding Figures are identified by the same numerals. The underside of the top housing half 100 is shown in plan view in FIG. 6. A flexible button pad member 102 is attached to the housing half 100 at 104. The pad assembly 102 includes a scan button portion 106 and a delete button portion 108 integrally connected to each other by the elongated, flexible, serpentine portion 110. Flange portion 112 and 114 of the button portions are normally held against the housing half 100 by internal protruding posts 116 which rest on an underlying circuit board assembly 152 depicted in FIGS. 7 and 8. Activation pillars 118 and 120 are integrally formed in their respective button portions 106 and 108 respectively.

In operation, when the scan button 106 is depressed, it triggers an electrical switch 150 located on an underlying circuit board assembly 152 shown in FIG. 7. Likewise, when the delete button 108 is depressed, it triggers an electrical switch 154, also located on the circuit board assembly 152.

The circuit board assembly 152, will now be described in greater detail in connection with FIGS. 7 and 8. The circuit board assembly is shown in FIG. 7 positioned in a lower housing half 156 and held in position by post 157 and pressure tabs 159, both carried by the lower housing half 156. The scanner exit window is located at 158. A scanner module or engine 160 is located on the underside of the circuit board assembly 152 and directs a laser scanning beam outward through the exit window at 158.

A scanner module useful in the code reader of the present invention is constructed in the shape of a rectangular solid and known as an SE 900 scanner module. Such a scanner module is disclosed in U.S. patent application Ser. No. 09/275,858 filed Mar. 24, 1999 which is hereby incorporated by reference. Alternatively, the scanner module may be a "scanner on a chip" such as disclosed in U.S. patent application Ser. No. 09/209,243 filed Dec. 10, 1998 which is hereby incorporated by reference. As a further alternate the scanner module may be of a cylindrical type as discussed below in connection with FIG. 13. Finally, the optical detection may be performed by a code reading engine employing imager technology such as disclosed in U.S. patent application Ser. No. 09/096,578 filed Sep. 1, 1998 and hereby incorporated by reference.

The circuit board assembly 152 includes a single main circuit board 161 on which electrical components are mounted, including switches 150 and 154, display LED 162, micro processor chip 164, memory chip 166 and I/O communications chip 168. Advantageously, the display LED is a conventional bi-color LED (red and green) capable of producing red, green and yellow light (yellow light being produced by combining red and green light). A communication connector socket 170 and the scanner module may be mounted on the underside of the circuit board 161 as shown in FIG. 8.

FIG. 9 illustrates the lower housing half of the optical code reader, with an upper wall of a battery compartment 180 cut away to reveal the location of the batteries 182 and 184, battery compartment side walls and spring contacts. In a preferred embodiment the batteries are AAA type batteries.

An outer side wall 186 of the battery compartment forms a side wall which encircles the batteries. Inner end walls 188 and 190 are configured with small apertures 192 slightly larger than the protruding contacts 194 (positive terminals) employed on standard 1.5 volt batteries. In operation the contacts 194 penetrate in the apertures 192 and make electrical contact with conductive spiral helical springs 196 and 198.

The opposite ends (negative terminals) 199 of the batteries are formed substantially flat and rest against helical springs 200 and 202 which protrude through larger apertures 204 in the inner side walls 188 and 190.

Spiral helical springs 196 and 200 are electrically connected together. Spiral helical springs 198 and 202 end in spring loaded arms 206 and 207, respectively. When the circuit board assembly 152 is positioned in the lower housing half 156, the spring arms maintain themselves in pressural contact with conductive lands 208 on the underside of the circuit board 161 shown in FIG. 8. Thereby, the batteries are connected in series to provide an appropriate voltage (typically 3V DC) to the circuit elements of the optical code reader.

It is conventional to include at least one diode in the power supply circuit of hand held battery powered scanners and other battery powered devices to prevent damage to the circuitry if a battery is inadvertently installed backwards (i.e., with its positive and negative terminals reversed). The need for such measures is obviated by the structures of FIG. 9. It will be readily understood that the contact spring for the positive battery terminal is accessible only if the protruding terminal 194 of the battery is inserted into the small aperture 192. These same contact springs are inaccessible to the wide, flat negative terminal of the battery. Accordingly, if a battery is inserted backwards, the circuit is not completed.

IV. Optical/Electronic Systems

Figure 10:
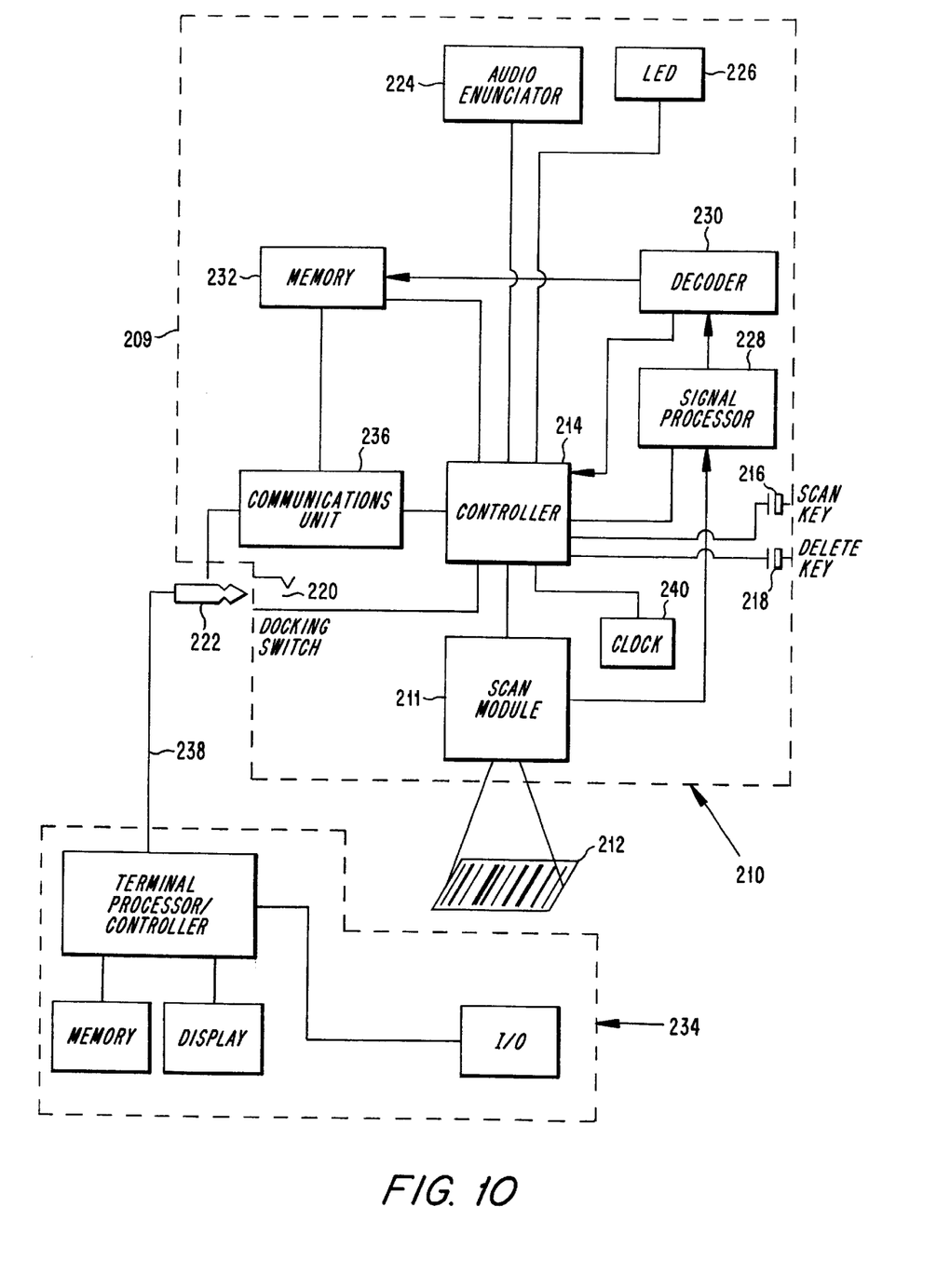
FIG. 10 is a schematic block diagram illustrating various electronic sub-systems usable in data collection systems in accordance with aspects of the present invention.

FIG. 10 is a schematic block diagram of a preferred embodiment of an optical code reading system of the present invention. Portions of the systems of FIG. 10 are described in U.S. Pat. No. 5,801,371, the contents of which is hereby incorporated by reference herein. Generally speaking, the system elements enclosed by the dotted line 209 may be housed in a hand held optical code reader 210, while the systems outside line 209 may be resident in an external computer or terminal which communicates with the reader through a communications link such as described above.

The hand held code reader 210 includes an optical code reading module 211 which may be an imager or a laser scan module of conventional construction or of the type described in detail below. The bar code being read is indicated at 212.

The module is controlled by a controller 214 which may be implemented in a microprocessor. The controller receives at least three user signals: from the scan key switch 216; from the delete key switch 218 and from the docking switch 220. The keys may be actuated by the fingers of the user; the docking switch may be actuated by insertion of a communication plug 222 into the docking switch.

The optical code reader 210 provides feedback directly to the user in at least two ways: through audible signals produced by one or more audio enunciators 224 and through visual signals produced by one or more light emitting diodes 226. In a preferred embodiment, the code reader provides audio feed back in the form of short or long beeps of two different frequency and warble beeps. Visual feedback may include continuous (solid) or flashing red, amber and/or green light signals from the LED. The audio enunciator(s) and LED(s) are operated response to the controller 214. Preferred techniques for providing the user feed back are described below.

Signals from the module 211 may be processed in signal processor 228 and decoded by decoder 230. Decoded signals may be provided for storage in the memory 232 which may have, for example, a capacity to store information of up to 500 scanned items (UPC codes). Information concerning coupons (discussed below) may preferably be stored in a separate memory or a distinct section of an existing memory. This segregation reflects the fact that coupon data may be stored for the duration of multiple scanning or shopping sessions until used. Information in the memory or memories may be communicated to an external terminal 234 through communications unit 236, the plug 222, cable 238.

A clock 240 may be included in the circuitry of the code reader. The clock may be employed, for example, to periodically awaken the code reader at scheduled times or intervals for data downloading. The clock may also be connected to a display (not shown) so that the code reader can be used as a time piece.

V. Host Terminal Implementations and Uses for the Code Reader

With continuing reference to FIG. 10, the optical code reader 210 may communicate with the terminal 234 in the manner described above. The type of terminal and communication used with the code reader will depend on the use environment for the code reader. Several examples will now be provided.

It will be understood that versions of the optical code readers described may be very inexpensively fabricated. So much so that it becomes feasible to sell the unit to store customers for use in tallying their purchases in store and/or for use at home in preparing shopping lists. As an alternate the code reader could be leased to the customer. The rental can be based on time (for example a monthly rental fee). More preferably, the rental may be based on the number of decodes performed by the customer with the unit. The numbers of decodes or accumulated rental charges can be counted by software and hardware in the code reader or in a store terminal with which the code reader periodically communicates. In this system, the rental is based on use and can be conveniently tallied and automatically collected when the code reader communicates with a system terminal.

In one preferred embodiment, the system terminal may be a personal computer. Through the appropriate selection of the communication unit 236 and the cabling, the reader may communicate directly with a serial port of the personal computer. The code reader and cradle may be provided as an inexpensive preferral component. Applications software installed on the computer enables the upload of a data from the code reader to the computer. Such software may be provided to the computer, for example, on magnetic media, CDs or over the Internet.

With appropriate applications software the PC can recognize when the code reader is docked in the cradle. The PC can, for example, download information from the docked reader at a predetermined time. Docking may automatically disable the scanning mode of the code reader.

In other preferred embodiments, the system terminal may be a highly capable point of sale terminal. The point of sale terminal may bring together inputs and data from a variety of sources other than the hand held optical code readers of customers and employees. Such sources include a pen tablet, a fingerprint recognition pad, a magnetic strip reader (e.g. for credit card verification), a smart card reader (with or without contacts), a speech recognition system, a global positioning system (GPS), an RF transceiver, removable memory cards or discs, analog I/O, IrDA data or an encryption/decryption system. Outputs of the terminal may include a display, a speaker system and a printer.

In a shopping environment, the system may provide additional functions such as aisle sorting the customers shopping list or providing price ranges for items on the list. Such information can be obtained by connecting the code reader to the merchants' data server to obtain product, price and/or location data on the items which the merchant has for sale.

Advantageously, a portion of the internal memory of the code reader can be allocated to a variety of applications other than storing information on scanned items. For example, 128 bytes of memory could be allocated to applications memory. Among the data which could be stored in the applications memory are the customer's name, the customer's telephone number, the identity of the issuing store or owner of the scanner and the telephone number of the store. The customer and the store identity and telephone numbers, provide convenient means by which a host terminal can greet and identify the user of the code reader and indicate and access the associated issuer or store. Alternatively or in addition, each code reader may be provided with a memory of its unique serial number which a host terminal may use to look up, for example, the identity of the customer or the issuing store. Such identification information may be used in a key and lock system which enables only authorized customers to use the scanner at authorized stores or for authorized purchases.

The allocated applications memory may also be employed to store transaction related data. For example, the memory may store the number of decodes for billing as described above, or keep a store-by-store log of the total dollar purchases (for example for tallying up volume or patronage discounts).

Other memory internal to the code reader may be used for storing coupon data. For example, an electronic coupon can be uploaded by scanning the bar code of a printed coupon or by electronically downloading the coupon from a web site or by simply inputting the coupon into the code reader when the code reader is connected to a merchant host terminal. For example, memory for 200 or 300 coupons might be provided including coupon values, expiration dates and validity data.

An example of the operation of a coupon redemption process is as follows. A customer could load electronic coupons into the reader in one or more of the ways described above. The customer could scan purchased items with the code reader. Data concerning both the purchased item and the electronic coupon could be downloaded by a merchant host terminal, which would pair valid coupons with corresponding purchases. The host terminal would discard expired coupons, delete used coupons, and return unexpired, unused coupons to the memory of the code reader.

In other preferred embodiments, a method is provided for using the bar code reader to facilitate a transaction between a buyer and at least one of a plurality of merchants or sellers of a product or service utilizing a computer network. In accordance with that method, a product or service identification derived from scanning a bar code symbol is in put into the bar code reader. A customer identifier is provided in the bar code reader (for example, a unique serial number permanently stored in the bar code reader). The bar code reader is manually associated with a transaction terminal linked to a computer network by, for example, docking the code reader in a host terminal. The potential suppliers on the network capable of providing the product or service are determined. An inquiry is transmitted over the network to the plurality of sellers to determine the price and availability of the product or service. In some environments such as stock transactions, price and availability change rapidly and it will be understood, that sales transactions can be performed in a timely way with the present method. Also, the sellers can use the customer identity to determine whether and under what terms to complete the sale. Responses are received in the host terminal from one or more sellers including a sales offer; an acceptance is transmitted responsive to one of said sale offers; and a payment is provided to the seller by using a payment identifier transmitted by the transaction terminal. In this way the network is accessed by the bar code reader to facilitate sales transactions.

In other preferred embodiments, a customized scanner is employed which carries an identifier of a particular supplier or distributor of a product or service, e.g. a sponsoring merchant. The sponsoring merchant may itself distribute its bar code readers to customers or potential customers. In this case the bar code reader may be used to facilitate transaction between a customer and the particular supplier to whom an inquiry is transmitted over a computer network to determine the current price and availability of a product or service from the supplier. The customer may receive a response from the supplier over the computer network including a current price. The customer may then transmit an acceptance identifier to the supplier over the computer network.

In further, preferred embodiments, the code reader is integrated with a wireless transceiver unit to facilitate a transaction between a buyer and a seller. For example bar code scanners of the present invention may be integrated into a cellular telephone. In such a case, the need to dock the scanner with a host terminal or home P.C. to upload or download data may be obviated. The user of such a system may input an order or bid request and directly transmit the order or bid request to a supplier. It will be understood that a customer or supplier identifier in the unit may be used for the purposes described above, in order, for example to direct customers to a sponsoring merchant, or to identify the customer to validate use, payment or acceptance.

VI. Actuator States, Timing, Indicators and Functionality.

Figure 11:
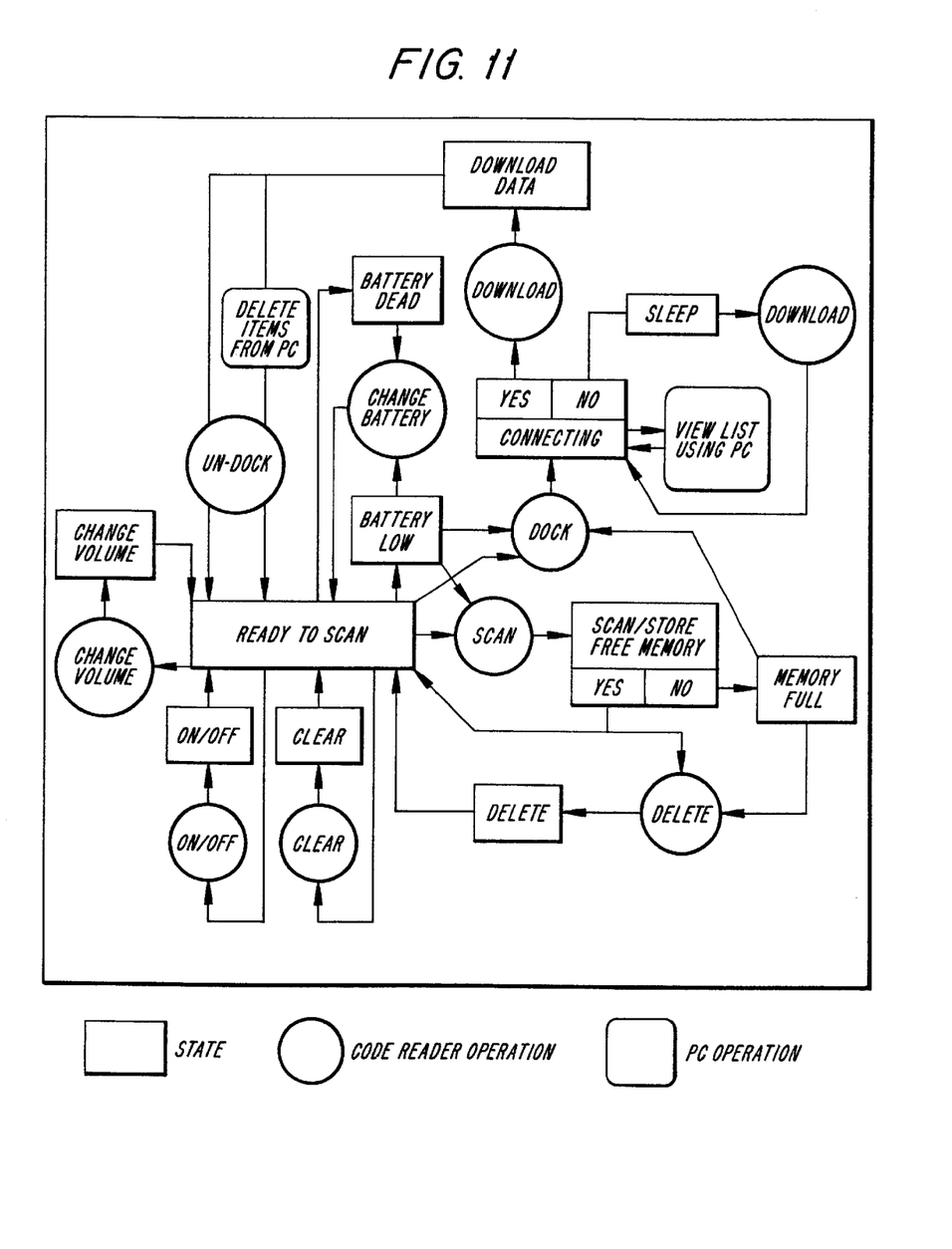
FIG. 11 is a state transition diagram of a preferred embodiment of the present invention.

FIG. 11 is a state transition diagram, illustrating the coordination of various functions of the optical codes reader/PC system of a preferred embodiment of the present invention. In the diagram various code reader operation such as scan, dock and delete are represented as circles. System states are represented as squares. The PC operation of viewing a list of stored items is shown in a rounded square accessible from the "dock" operation. The diagram, indicates, among other things, the various options or responses to the condition of full memory or low battery.

As noted above, the code reader of a preferred embodiment has two user actuated keys and a number of audio and visual feedback capabilities. These inputs and outputs are coordinated with at least five basic functions: Scan (e.g., item input), deletion of item, clearing memory, communicating with a host terminal and actuating a lock out. The relationship of the user action to function performed and audible/visual feedback are given in the following Table I.

TABLE I

Code Reader Functions - User Action/Feedback

| Function Performed | User Action | LED Feedback (Greem, Red, Amber) | Beeper Feedback | Other |
|---|---|---|---|---|
| Scan | | | | |
| Item bar code | Press & hold scan key | Flashing green –> solid green | Short beep, freq1 | Laser |
| Valid param bar code | | Flashing green –> solid green | 2 short beeps, freq1 | Laser |
| Invalid param bar code | | Flashing green –> solid red | 3 short beeps, freq1 | Laser |
| Delete | | | | |
| (When enabled) | | | | |
| Item barcode | Press & hold delete key | Flashing amber –> solid amber | Short beep, freq2 | Laser |
| Item doesn't exist | | Flashing amber –> solid red | Warble beep. | Laser |
| Param bar code | | Flashing amber –> solid red | 3 short beeps | Laser |
| (Delete disabled-Clear All enabled) | Press & hold delete key | Flashing amber Fall through to Clear All | None | Laser |
| (Delete & Clear All disabled) | Press & hold delete key | None | None | None |

TABLE I-continued

Code Reader Functions - User Action/Feedback

| Function Performed | User Action | LED Feedback (Greem, Red, Amber) | Beeper Feedback | Other |
|---|---|---|---|---|
| Clear All | | | | |
| (When enabled) | Press & hold delete key 3 sec past scan time | Flashing amber -> solid amber | Long beep, freq2 | Laser on for scan time, then off |
| (When disabled) | Hold delete key past scan time | None | None | |
| Host Communication | | | | |
| Successful (Powerdown recv'd) | Unit docked and awakened by Host or push of scan or delete key | Flashing green -> solid green | Short beep on host connect, then long beep on power down | None |
| Unsuccessful | | Flashing green -> solid red | | None |
| Child Lock Toggle | | | | |
| (When enabled) | Press & hold both scan and delete keys for 1 sec | None | Hi low, Hi low | None |

Under the "Scan" function, three possibilities and their user feedbacks are noted in Table I: scan of an item bar code, scan of a valid param bar code and scan of an invalid param bar code. Param bar codes are bar codes which change the behavior or basic functionality of the code reader, rather than indicating the identity of a particular item in the manner of a UPC code. As such the param bar code may be used to effect or toggle higher level operations such as for example converting the code reader to a laser pointer.

Under the "Delete" function, three possibilities are noted in Table I: scan of an item bar code previously entered in memory, scan of a bar code not in memory, and scan of a param bar code. When the delete function is enabled, the scanning of an item bar code previously entered in memory, deletes one of the item from memory. Repeated use of this delete function may be used to decrement the quantity field in memory for the item, one unit at a time. Scanning of the bar code of an item whose current count in memory is zero while pressing and holding the delete key, provides the user a feedback signal of the unability to delete. Param bar codes may be scanned to enable or disable the Delete function and Clear All function (described below).

Under the Clear All function, two possibilities are noted in Table I: when Clear All function is enabled or when Clear All function is disabled. When the Clear All function is enabled, pressing and holding the delete key while scanning an item bar code and holding the delete key 3 seconds past the scan time, deletes all of the items memory (reduces the item count to zero) and provides the indicated user feedbacks. In this way the memory can be cleared of all of an item, and, if desired, one or more of the item may then be reentered by using the Scan function for the item bar code. Advantageously, the default setting of the code reader is one in which both the Clear All and Delete functions are enabled.

As shown in Table I a Lock Toggle is provided in the code reader. The system may be employed to shut out unauthorized use to protect data and to prevent inadvertent eye exposure to laser light. As indicated in Table I the function is performed by pressing and holding both the scan and delete keys for one second. Because of the location of the two keys and the location of the blocking ridge 44 around the delete key, accidental toggling of the lock is minimized.

Figure 12:
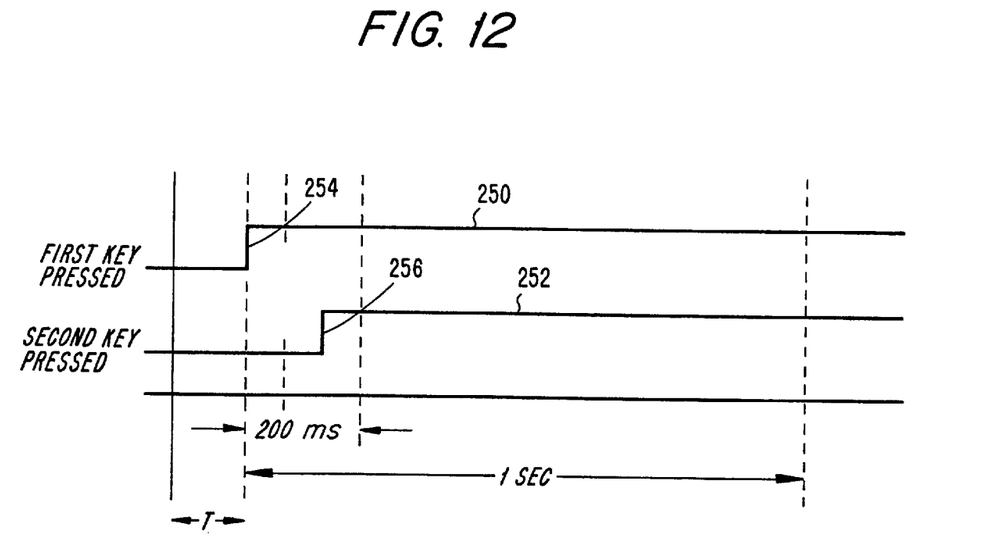
FIG. 12 is a timing diagram for the lock toggle function of a preferred embodiment of the present invention.

FIG. 12 is a switch timing diagram for the Lock Toggle function. In the example, the state of a first key pressed (the scan or delete key) is indicated by line 250. The state of the other key is indicated by line 252. A delay of T occurs during which the unit powers up and recognized the first key press at 254. An additional interval of up to 200 milliseconds is provided for pressing of the other key to toggle the lock out function. If the second key is pressed within that interval (as it is at 256) and if both keys remain depressed fro the remainder of the 1 second interval, the lock is toggled. The requirement that actuation of both keys be detected within the 200 millisecond period tends to prevent lock out toggling except in situations where the user intended to simultaneously press both buttons.

The code reader is also capable of communicating certain special conditions such as MEMORY LOW (reader memory nearly filled to capacity), MEMORY FULL, BATTERY LOW, LOCK ENABLED AND ON, and UNEXPECTED FAILURE. (The BATTERY DEAD condition is implicitly communicated because the system ceases to respond altogether when the battery is dead). The relationship of user actions, the special conditions, and the audible/visible feedback are given in the following Table II.

TABLE II

Code Reader Functions-User Action/Feedback
Special Cases

| Special Condition | User Action | LED Feedback (Green, Red, Amber) | Beeper Feedback | Other |
|---|---|---|---|---|
| Memory Low | | | | |
| Scan Item or param bar codes | Press & hold scan key | Flashing red -> Normal operation | Normal operation | Laser |
| Delete/Clear All | Press & hold delete key | Normal operation | Normal operation | Laser |
| Memory Full | | | | |
| Scan Any bar code | Press & hold scan key | Solid red | Long beeps for 5sec or until scan released | None |
| Delete/Clear All | Press & hold delete key | Normal operation | Normal operation | Laser |
| Battery Low Indication | | | | |
| (When enabled) Scan Item & param bar codes | Press & hold scan key | Solid red -> normal operation | Normal operation | Laser |
| Delete Item & param bar codes | Press & hold delete key | Solid red -> normal operation | Normal operation | Laser |
| Clear All | Press & hold delete key 3sec past scan time | Solid red -> solid amber | Long beep, freq2 | Laser on for scan time then off |
| Lock | | | | |
| (Enabled & ON) | scan/delete/dock | Rapidly flashing red | None | None |
| Unexpected Failure | scan/delete/dock | Flash red, green and amber for 5 sec (Service Call) | None | None |
| Battery Dead | scan/delete/dock | None | None | None |

It will understood that the code reader of the above-described embodiments in capable of performing its many functions and provide user feedback without the need of an on board display screen, thus reducing the cost and complexity of the code reader.

VII. Opto-mechanical Layout of Cylindrical Module Embodiment

Figure 13:
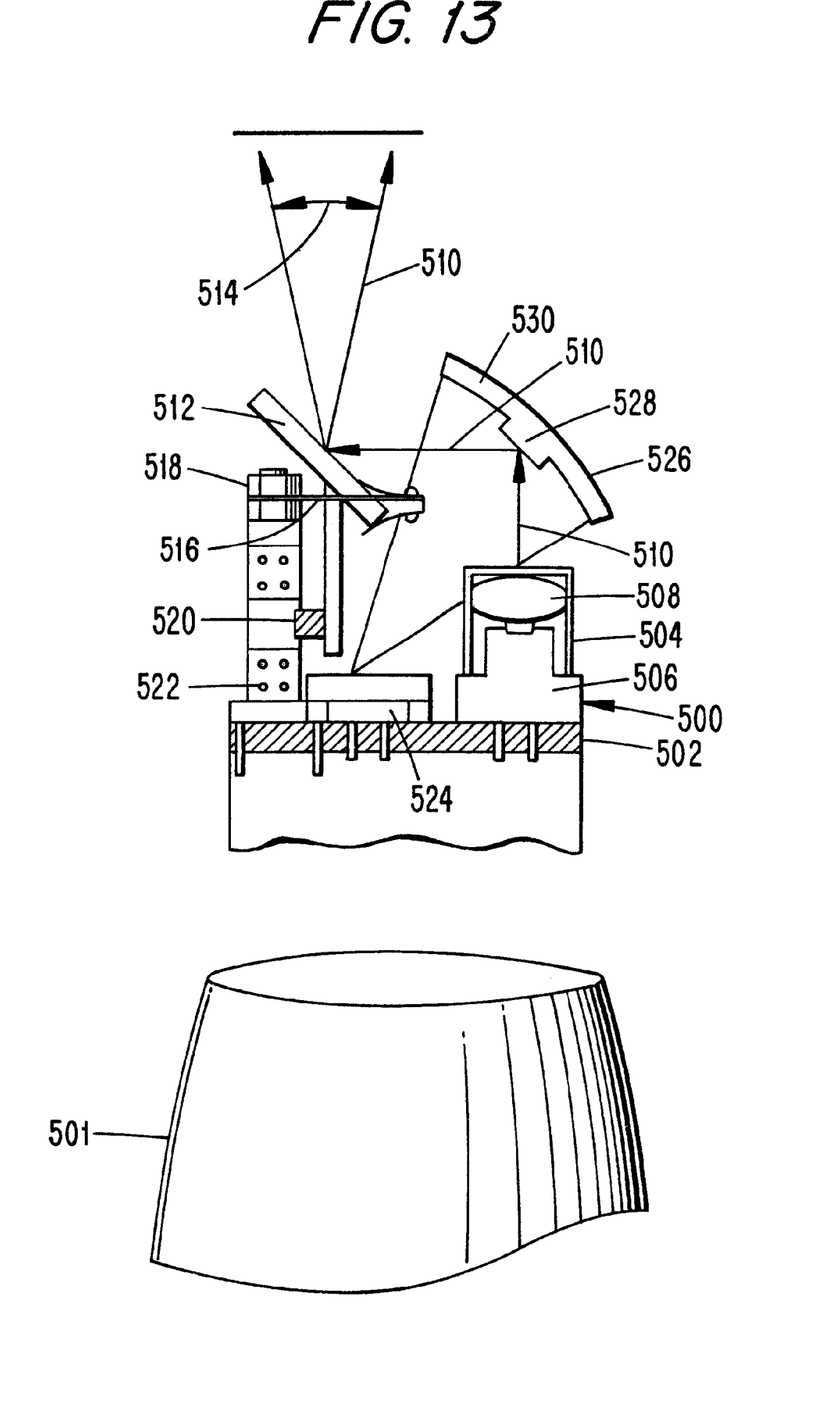
FIG. 13 is a side cross-sectional view of a laser scan module used in a preferred embodiment of the present invention.

FIG. 13 illustrates an embodiment of a laser scan module for use in generally cylindrical housings. The module of FIG. 13 employs a mirror mounted on a leaf spring. Alternative embodiments may use spiral tape springs which permit the mirror to pivot about a shaft about which the spiral tape spring is wrapped.

In FIG. 13, the laser scan module 500, includes a generally circular planar base 502. It is adapted to be housed in a generally cylindrical housing such as that indicated at 501. Alternatively the module may be positioned on a code reader main circuit board such as shown in FIG. 8. A semiconductor light source 504, such as a laser diode 506 and lens 508 may be located on the base 502. The light source 504 generates a light beam projected along a first optical path indicated by arrows 510.

A generally planar, reciprocally oscillated reflector or mirror 512 is positioned above the base and located in the first optical path 510. The reflector directs the laser beam impinging on it toward a code symbol located in the field indicated by arrow 514. A spring coupled to the reflector 512, pivotably supports the reflector for oscillating movement. In the embodiment of FIG. 13, the spring is a leaf spring 516, fixed to the module at 518.

A drive mechanism is also supported on the base 502 for reciprocally oscillating the reflector 512. The drive may include a permanent magnet 520 connected to the reflector and coupled to an electromagnetic coil 522. When an alternating drive signal is applied to the coil 522, an alternating magnetic field is produced which acts to oscillate the permanent magnet and, in turn, to flex the spring and reciprocally oscillate the reflector about an axis generally perpendicular to the plane of the Figure.

A photo detector 524, such as a semiconductor photo diode is also mounted on the circular base under the reflector. The photo detector generates an electrical signal indicative of light reflected from a target code symbol. A one-piece optical element 526, includes a beam folding section (such as generally planar section 528), and a collection mirror portion (such as curved portion 530). The optical element 526 is designed to receive retro-reflected light from the reflector and direct it to the photo detector 524.

While aspects of the present invention have been described with reference to preferred embodiments and examples, the invention to be protected is defined by the literal language of the following claims and equivalents thereof.

We claim:

1. A method for using a bar code reader to facilitate a transaction between a buyer and at least one of a plurality of sellers of a product or service utilizing a computer network comprising:

inputting into the bar code reader a product or service identification derived from scanning a bar code symbol;

providing a customer identifier in the bar code reader;

manually associating the bar code reader with a transaction terminal linked to a computer network;

determining the potential suppliers on the network capable of providing the product or service;

transmitting an inquiry over the network to the plurality of sellers to determine the price and availability of the product or service;

receiving in the terminal responses from one or more sellers including a sales offer;

transmitting an acceptance responsive to one of said sales offers; and providing a payment to said one seller by using a payment identifier transmitted by the transaction terminal.

2. A method for using a bar code reader to facilitate a transaction between a buyer and a supplier or distributor of a product or service utilizing a computer network comprising:

inputting into the bar code reader a product or service identification derived from scanning a bar code symbol;

providing a customer identifier, a payment identifier and a supplier identifier in the bar code reader;

transmitting an inquiry over the network to the supplier to determine the current price and availability of the product or service;

receiving in a response from the supplier over the network including the current price; and transmitting an acceptance identifier to the supplier over the network.

3. A method for using an integrated bar code reader and wireless communications transceiver unit to facilitate a transaction between a buyer and a seller of a product or service in a computer network comprising:

inputting into the unit a product or service identification derived from scanning a bar code symbol;

providing a customer identifier in the unit;

accessing the network by wireless communication to determine if a seller is capable of providing the product or service;

transmitting an inquiry over the network to determine the current price of the product or service;

receiving in the unit responses from one or more sellers including a sales offer; and transmitting an acceptance responsive to one of said sales offers.

4. The method of claim 1, wherein the bar code reader is manually associated with the transaction terminal by docking the code reader in a docking station adapted to receive the code reader and establish a communications link with the transaction terminal.

5. The method of claim 4, wherein the bar code reader is a battery operated mobile unit for reading a bar code which identifies the product or service to be purchased.

6. The method of claim 1, wherein the customer identifier is stored in an electronic memory in the bar code reader.

7. The method of claim 1, wherein the customer identifier and a payment identifier are stored in an electronic memory of the bar code reader.

8. The method of claim 2, wherein the customer identifier, the payment identifier and the supplier identifier are stored in an electronic memory of the bar code reader.

9. The method of claim 2, further comprising the step of providing the customer with mobile, battery powered bar code reader.

10. The method of claim 9, wherein the inquiry is transmitted over the network by docking the bar code reader in a docking station adapted to receive the code reader and establish a communication link with a transaction terminal linked with the computer network.

11. The method of claim 3, wherein the customer identifier is stored in an electronic memory in the bar code reader.

12. The method of claim 3, wherein the customer identifier and a payment identifier are stored in an electronic memory in the bar code reader.

* * * * *